(12) United States Patent
Rice

(10) Patent No.: US 6,388,739 B1
(45) Date of Patent: May 14, 2002

(54) SELF-REFERENCING MICRODOPPLER LADAR RECEIVER AND ASSOCIATED DETECTION METHOD

(75) Inventor: Robert Rex Rice, Simi Valley, CA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/764,583

(22) Filed: Jan. 18, 2001

(51) Int. Cl.[7] .............................. G01C 3/08; G01P 3/36; G01B 9/02
(52) U.S. Cl. .................. 356/28.5; 73/657; 356/477; 356/5.09
(58) Field of Search .............................. 356/5.09, 28.5, 356/482, 486, 477; 73/657

(56) References Cited

U.S. PATENT DOCUMENTS

| | | |
|---|---|---|
| 5,194,847 A | * 3/1993 | Taylor et al. |
| 5,574,553 A | 11/1996 | McManamon et al. |
| 5,587,785 A | 12/1996 | Kato et al. |
| 5,621,514 A | 4/1997 | Paranto et al. |
| 5,715,044 A | 2/1998 | Hayes |
| 5,724,125 A | 3/1998 | Ames |
| 5,825,465 A | 10/1998 | Nerin et al. |
| 5,835,199 A | 11/1998 | Phillips et al. |
| 5,847,815 A | 12/1998 | Albouy et al. |
| 5,847,816 A | 12/1998 | Zediker et al. |
| 5,847,817 A | 12/1998 | Zediker et al. |
| 5,867,257 A | 2/1999 | Rice et al. |
| 5,877,851 A | 3/1999 | Stann et al. |
| 5,946,130 A | 8/1999 | Rice |
| 6,011,506 A | * 1/2000 | Li .............................. 342/54 |

* cited by examiner

Primary Examiner—S. C. Buczinski
(74) Attorney, Agent, or Firm—Alston & Bird LLP (57) ABSTRACT

A self-referencing microdoppler ladar receiver is provided for detecting the vibration of a target based upon an analysis of backscattered signals without a local reference derived from the transmitter. The self-referencing microdoppler ladar receiver includes a frequency shifter for receiving a backscattered signal from the target and for controllably shifting the frequency of the backscattered signal. The self-referencing microdoppler ladar receiver also includes an interferometer, such as a Mach Zender interferometer, for directing portions of the frequency shifted signals along first and second paths of unequal length and for combining the portions of the frequency shifted signals to produce first and second output signals. The self-referencing microdoppler ladar receiver also includes a signal processor for providing a feedback signal to control the frequency shifter based upon differences in the respective power levels of the first and second output signals. In particular, the signal processor provides the feedback signal to control the frequency shifter in order to drive the interferometer towards quadrature. Since the feedback signal provided by the signal processor is proportional to the instantaneous frequency of the backscattered signal which, in turn, includes frequency contributions due to the vibrational velocity of the target, the vibration of the target is detectable without locally referencing the primary laser beam generated by the transmitter. A microdoppler ladar system including a self-referencing microdoppler ladar receiver and an associated detection method are also provided.

22 Claims, 3 Drawing Sheets

SELF-REFERENCING MICRODOPPLER LADAR RECEIVER AND ASSOCIATED DETECTION METHOD

FIELD OF THE INVENTION

The present invention relates generally to ladar systems and, more particularly, to a self-referencing microdoppler ladar receiver and an associated detection method.

BACKGROUND OF THE INVENTION

Lidar, laser ladar, optical ladar, and ladar (hereinafter collectively termed "ladar") are all names for "ladar" systems utilizing electromagnetic radiation at optical frequencies. The radiation used by ladar is at wavelengths which are 10,000 to 100,000 times shorter than that used by conventional radar. Nonetheless, radiation in the form of photons is scattered by the target and is collected and processed to yield information about the target and/or the path to the target.

Ladar uses the same principle as radar, i.e., the ladar system transmits optical signals to a target, the transmitted optical signals interact with the target, and some of the optical signals are reflected or scattered back to the ladar system where the backscattered signals can be analyzed. The change in the properties of the backscattered signals enables some property of the target to be determined. For example, the round trip time required for the optical signals to travel to the target and back to the ladar system is commonly used to determine the range to the target.

One type of ladar system is a Doppler ladar system that is used to measure the velocity of a target. When the optical signals transmitted from the ladar system strike a target moving towards or away from the ladar system, the wavelength of the light reflected or scattered off the target will be changed slightly. This change is known as a Doppler shift—hence the term Doppler ladar. If the target is moving away from the ladar system, the return light will have a longer wavelength (sometimes referred to as a red shift) while the target is moving towards the ladar system, the return light will have a shorter wavelength (producing so-called blue shift).

As described by U.S. Pat. Nos. 5,847,816; 5,847,817 and 5,867,257, the contents of each of which are incorporated herein in their entirety, a microdoppler ladar system can be utilized to detect and to obtain the vibration signature of a number of targets. For example, a microdoppler ladar system can obtain the vibration signature of various military targets for target classification, damage assessment, intelligence gathering and the like. By way of further example, a microdoppler ladar system can be utilized to measure the vibrational spectrum of bridges, buildings, pipelines, pumps, aircraft, volcanoes and the like. Accordingly, a microdoppler ladar system can assist in determining the mechanical status of machinery for a variety of purposes. Moreover, a microdoppler ladar system may be able to monitor the vital signs of a remotely located person, such as a witness during a deposition or a lie detector examination.

A conventional microdoppler ladar system includes a transmitter and a coherent receiver. The transmitter includes a master oscillator and an associated power amplifier for generating a primary laser beam that illuminates the target. The coherent receiver is responsive to backscattered signals produced by the interaction of the transmitted laser beam and the target. The coherent receiver can include a phase locked loop for receiving both the backscattered signals and the primary laser beam generated by the transmitter. By phase locking the backscattered signals and the primary laser beam generated by the transmitter, the phase locked loop can generate signals indicative of the range, the velocity and a characteristic signature of the target. Therefore, a conventional microdoppler ladar system requires that the coherent receiver not only detect the backscattered signals, but also be provided with a sample of the primary laser beam generated by the transmitter for purposes of phase locking with the backscattered signals.

It is oftentimes advantageous for microdoppler ladar systems to detect targets at relatively long ranges. However, the range of conventional microdoppler ladar systems is primarily limited by two factors. First, the transmitter must provide a primary laser beam that has sufficient power to obtain useful backscattered signals. Secondly, the master oscillator of the transmitter must be selected such that the coherence length of the master oscillator is somewhat longer than the cumulative distance from the transmitter to the target and then to the receiver in order for the coherent receiver to properly combine the backscattered signals and the primary laser beam. As such, for a conventional microdoppler ladar system in which the transmitter and receiver are colocated, the microdoppler ladar system cannot reliably detect target vibrations if the target is spaced from the master oscillator by a distance that is more than one-half of the coherence length of the master oscillator.

The coherence length $l_c$ of a master oscillator is related to the frequency linewidth $\Delta v$ of the master oscillator as follows: $l_c = \pi(c/\Delta v)$ wherein c is the speed of light. In order to have the long coherence lengths required to detect remote targets, the master oscillator must therefore be designed to have an extremely narrow linewidth. For example, microdoppler ladar systems onboard spacecraft that are designed to detect targets on the earth would be required to have a master oscillator with an extremely narrow linewidth. Likewise, ground-based microdoppler ladar systems designed to detect targets disposed in space would also be required to have a master oscillator with an extremely narrow linewidth. Similarly, the detection and classification of long range airborne targets would also require a master oscillator having an extremely narrow linewidth since the range of the microdoppler ladar system would have to be in excess of 500 km in some situations. Unfortunately, master oscillators, such as fiber optic sources, semiconductor lasers and diode pumped solid state lasers, having linewidths that are sufficiently narrow for these long range applications are not readily available and, even if available, would greatly increase the cost of the resulting microdoppler ladar system.

SUMMARY OF THE INVENTION

A self-referencing microdoppler ladar receiver and an associated detection method are therefor provided for detecting the vibration of a target based upon an analysis of backscattered signals without a local reference derived from the transmitter. As such, the self-referencing microdoppler ladar receiver and the associated detection method can detect targets at long ranges since the analysis of the backscattered signals from the target does not require a comparison or phase locking to the primary laser beam emitted by the transmitter. The self-referencing microdoppler ladar receiver and associated detection method is particularly useful for space-to-earth, earth-to-space and long range air-to-air, ground-to-air and air-to-ground applications.

The self-referencing microdoppler ladar receiver includes a frequency shifter for receiving a backscattered signal from the target and for controllably shifting the frequency of the backscattered signal. The frequency shifter can include, for example, an acoustooptic frequency shifter for shifting the frequency spectrum of the backscattered signals. The self-referencing microdoppler ladar receiver also includes an interferometer, such as a Mach Zender interferometer, for directing portions of the frequency shifted signals along first and second paths of unequal length and for combining the portions of the frequency shifted signals to produce first and second output signals. According to one embodiment, the first path of the interferometer includes a delay loop for delaying the respective portion of the frequency shifted signals by a predetermined time relative to the other portion of the frequency shifted signals. In addition, the interferometer can include a coupler for combining the portions of the frequency shifted signals following their propagation along the first and second paths to produce the first and second output signals.

The self-referencing microdoppler ladar receiver also includes a signal processor, such as a voltage controlled oscillator, for providing a feedback signal to control the frequency shifter based upon differences in the respective power levels of the first and second output signals. In particular, the signal processor provides the feedback signal to control the frequency shifter in order to drive the interferometer towards quadrature. Since the feedback signal provided by the signal processor is proportional to the instantaneous frequency of the backscattered signal which, in turn, includes frequency contributions due to the vibrational velocity of the target, the vibration of the target is detectable without locally referencing the primary laser beam generated by the transmitter.

In one embodiment, the self-referencing microdoppler ladar receiver can also include a balanced coherent receiver disposed between the interferometer and the signal processor. The balanced coherent receiver of this embodiment includes first and second detectors for detecting the first and second output signals, respectively. In addition, the balanced coherent receiver can include a differential amplifier for combining the outputs of the first and second detectors to thereby amplify the differences in the respective power levels of the first and second output signals.

According to one aspect of the present invention, the self-referencing microdoppler ladar receiver is one component of a microdoppler ladar system. According to this aspect of the present invention, the microdoppler ladar system also includes a transmitter that, in turn, may include a master oscillator for producing signals to illuminate the target. Since the self-referencing microdoppler ladar receiver does not phase lock or otherwise compare the backscattered signals to the signals generated by the transmitter, the transmitter need not have as narrow of a linewidth and correspondingly need not have as long of a coherence length as the transmitters of conventional microdoppler ladar systems. For example, the transmitter can be selected such that the signals produced thereby have a coherence length that is less than the cumulative distance from the transmitter to the target and from the target to the receiver.

Accordingly to another aspect of the present invention, a method of detecting the vibration of a target without a local reference derived from the transmitter that illuminates the target is provided. The method of this aspect of the present invention controllably shifts the frequency of a signal backscattered from the target and then directs portions of the frequency shifted signals along first and second paths defined by an interferometer. As described above, the first and second paths are of unequal length such that the portion of the frequency shifted signal propagating along the first path is delayed relative to the portion of the frequency shifted signal propagating along the second path. The respective portions of the frequency shifted signal are then combined to produce first and second output signals. Based upon the differences in the respective power levels of the first and second output signals, a feedback signal is provided to control the frequency shift imparted upon the backscattered signal, thereby driving the interferometer towards quadrature. According to one embodiment of this detection method, the first and second output signals are separately detected prior to providing the feedback signal. In addition, the differences between the first and second output signals can be amplified prior to providing the feedback signal based thereupon.

Since the feedback signal is proportional to the instantaneous frequency of the backscattered signal which, in turn, includes frequency contributions due to the vibrational velocity of the target, the vibration of the target is detectable by a receiver without a local reference derived from the transmitter. As such, the self-referencing microdoppler ladar receiver and the associated detection method can operate independently of the transmitter, thereby permitting the vibrational velocity of the target to be reliably determined even through the cumulative distance from the transmitter to a backscattered signal from remote target and from the target to the receiver is greater than the coherence length of the transmitter. The self-referencing microdoppler ladar receiver and the associated detection method are therefore particularly well suited for the detection and analysis of long range targets, such as the detection of earth-based targets from a spacecraft, the detection of targets in space by a earth-based ladar system and the detection of distant aircraft or other airborne objects. Moreover, the self-referencing microdoppler ladar receiver can advantageously be located in many different positions relative to a transmitter and need not be co-located therewith, thereby increasing the flexibility of the microdoppler ladar system and permitting the self-referencing receiver to detect the vibration of different portions of the target.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
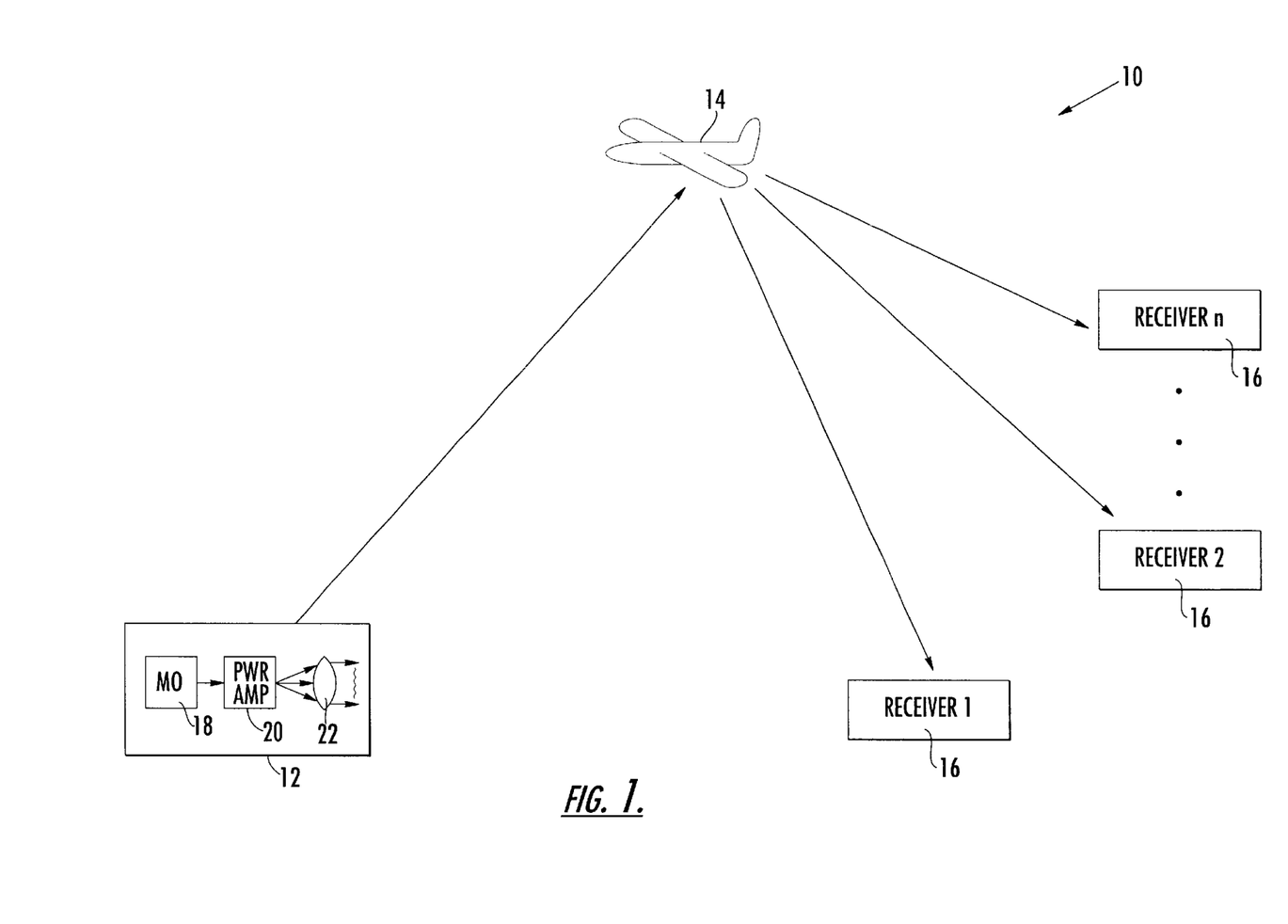
FIG. 1 is a schematic representation of a microdoppler ladar system according to one embodiment of the present invention.

Referring now to FIG. 1, a microdoppler ladar system 10 according to one advantageous embodiment of the present invention is depicted. The microdoppler ladar system includes a transmitter 12 for producing signals, typically referenced as a primary laser beam, to illuminate one or more targets 14. The microdoppler ladar system can be designed to illuminate a variety of targets and is particularly advantageous for the illumination and subsequent detection of long range targets in order to monitor the vibrational velocity of the targets. For example, the microdoppler ladar system can be designed to illuminate and detect the vibrational velocity of aircraft or other military targets in a battlefield application. In addition, the microdoppler ladar system can be designed to illuminate and detect the vibrational velocity of mechanical or earthen targets such as bridges, buildings, pipelines, machinery, volcanoes and the like. Furthermore, the microdoppler ladar system can be designed to illuminate and subsequently detect the vibrational velocity of a person which, in turn, can be translated into an approximation of the vital signs of the person. As will be apparent, the vital signs of a person will provide information regarding the stress to which the person is subjected and can therefore be advantageously utilized, for example, during a lie detector test.

The microdoppler ladar system 10 also includes at least one and, in some instances, a plurality of self-referencing receivers 16 for receiving backscattered signals from the target 14 in response to the illumination of the target by the transmitter 12. While the self-referencing receiver can be co-located with the transmitter, the self-referencing receiver is oftentimes located remote from the transmitter and remote from any other receivers. As described below, the flexibility with which the self-referencing receiver can be located remote from the transmitter is facilitated by the microdoppler ladar system of the present invention since the vibrational velocity of the target can be determined by the self-referencing receiving without a local reference derived from the transmitter, i.e., without phaselocking or otherwise comparing the backscattered signals to the primary laser beam emitted by the transmitter.

As will be apparent in light of the following discussion, the microdoppler ladar system 10 can be configured in several different manners. For example, the microdoppler ladar system can illuminate a target 14 and can detect backscattered signals with a single self-referencing receiver 16 that is located either coincident with the transmitter 12 or at a remote position relative to the transmitter. Moreover, the microdoppler ladar system can include a plurality of self-referencing receivers as depicted in FIG. 1. As shown, the self-referencing receivers are preferably disposed at different respective positions relative to the target such that each self-referencing receiver is remote from the transmitter and from the other self-referencing receivers. Upon illumination of the target by the transmitter, each self-referencing receiver will receive backscattered signals that permit different respective portions of the target to be examined. By combining the backscattered signals received by the plurality of the self-referencing receivers, the microdoppler ladar system of this embodiment can create a vibrational map or image of the target. Furthermore, the self-referencing receiver of the present invention can be utilized to detect backscattered signals generated by the illumination of a target by a transmitter that is otherwise unrelated to the self-referencing receiver. For example, in instances in which assets of a first military force are being interrogated by a microdoppler ladar system operated by another military force, the first military force can monitor the backscattered signals with a self-referencing receiver in order to determine the quality of the information being collected by the other military force since the self-referencing receiver does not require a local reference derived from the transmitter as required by conventional microdoppler ladar systems.

As depicted in FIG. 1, the transmitter 12 includes a master oscillator 18 for providing signals, such as a primary laser beam, to illuminate a target 14. As will be appreciated by those skilled in the art, the master oscillator can be any type of conventional master oscillator laser, such as a fiber optic laser oscillator, a semiconductor laser oscillator or a diode pumped solid state laser oscillator. In order to permit backscattered signals to be collected from relatively distant targets, the transmitter also generally includes a power amplifier 20, such as a fiber optic power amplifier, for amplifying the primary laser beam, provided by the master oscillator. The transmitter also typically includes transmit optics 22 to direct the primary laser beam toward target. In addition to directing the input signals toward the target, the transmit optics of one advantageous embodiment also collimates the primary laser beam. As will also be appreciated by those skilled in the art, the transmit optics can include any conventional type of optical elements including an optical lens, a mirror, a phased array of lensed fibers, or the like. In addition, the transmit optics can be gimbal mounted so as to permit the signals provided by the master oscillator to be swept across a predetermined area, such as a portion of the sky.

As should also be appreciated by those skilled in the art, the transmitter 12 can also include other conventional components that are understood to be part of any practical ladar transmitter, but which have been omitted from the drawings so as not to obscure the fundamental features of the present invention. For example, the transmitter can include an optical oscillator positioned immediately downstream of the master oscillator 18 to prevent feedback from downstream components, such as the power amplifier 20, that would otherwise induce instability in the master oscillator. In addition, the self-referencing receiver 16 could include a polarizer and the interferometer 30 described below could be constructed with polarization maintaining fiber, if so desired. Details of such conventional components are well known to those skilled in the art and will not be discussed further herein.

In contrast to conventional ladar transmitters that are required to have very narrow linewidths in order to have correspondingly long coherence lengths, namely, a coherence length that is greater than the cumulative distance from the transmitter to the target and then to the receiver, the transmitter 12 and, more particularly, the master oscillator 18, of the present invention need not be so limited and can have a relatively broad linewidth and a correspondingly shorter coherence length. In this regard, the coherence length of the signals transmitted by the transmitter and, more particularly, the master oscillator need not be greater than the cumulative distance from the transmitter to the target 14 and then to the receiver 16. Although the limitations upon the linewidth of the transmitter are therefore relaxed according to the present invention, the transmitter preferably has a sufficiently narrow linewidth such that the microdoppler frequency shifts in the backscattered signals due to the vibrational velocity of the target are not masked by deviations in the frequency of the master oscillator. Typically, a master oscillator having a linewidth of 1 kHz or less is sufficient for detecting the vibrational velocity of targets located at a cumulative distance of 50 km from both the transmitter and the receiver. Moreover, since the modulation of the backscattered signals by target vibration is dependent upon both vibration amplitude and vibration frequency, the master oscillator must generally have a linewidth that is less than the spectral width of the vibration signal. In addition, the master oscillator is preferably selected so as to provide stable outlet frequency within the gain spectrum of the power amplifier 20, typically while operating in a $TEM_{00}$ mode.

Figure 2:
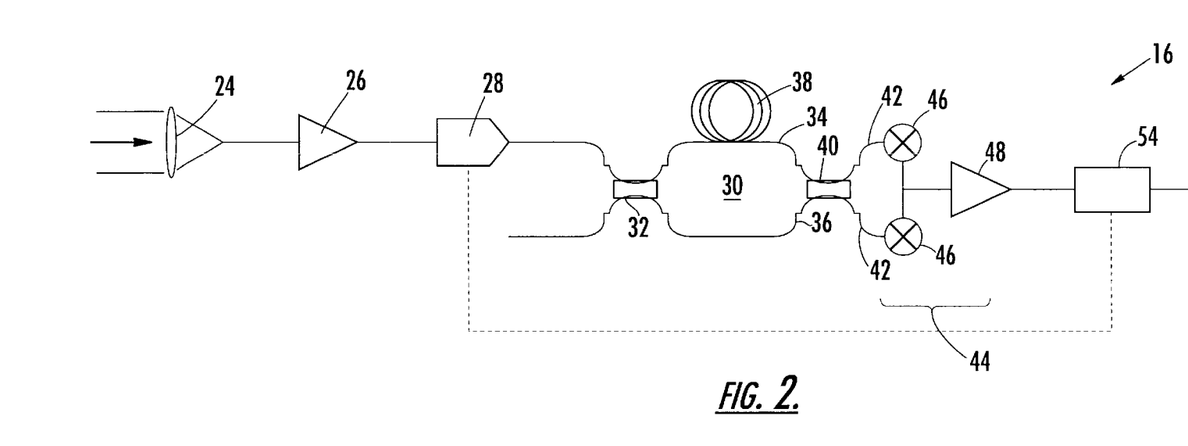
FIG. 2 is a schematic representation of a self-referencing microdoppler ladar receiver according to one embodiment of the present invention.

As described above, the microdoppler ladar system 10 also includes one or more self-referencing receivers 16 for receiving the backscattered signals from the target 14 and for analyzing the vibrational velocity of the target in a manner that is independent of any local reference to the master oscillator 18. As depicted in FIG. 2, the self-referencing microdoppler ladar receiver includes receive optics 24 for receiving the collimated backscattered signals from the target. As described above in conjunction with the transmit optics 22, the receive optics can be any of a variety of conventional optical elements, including an optical lenses, a telescope, a mirror, and a phased array of lensed fibers or the like.

Figure 4:
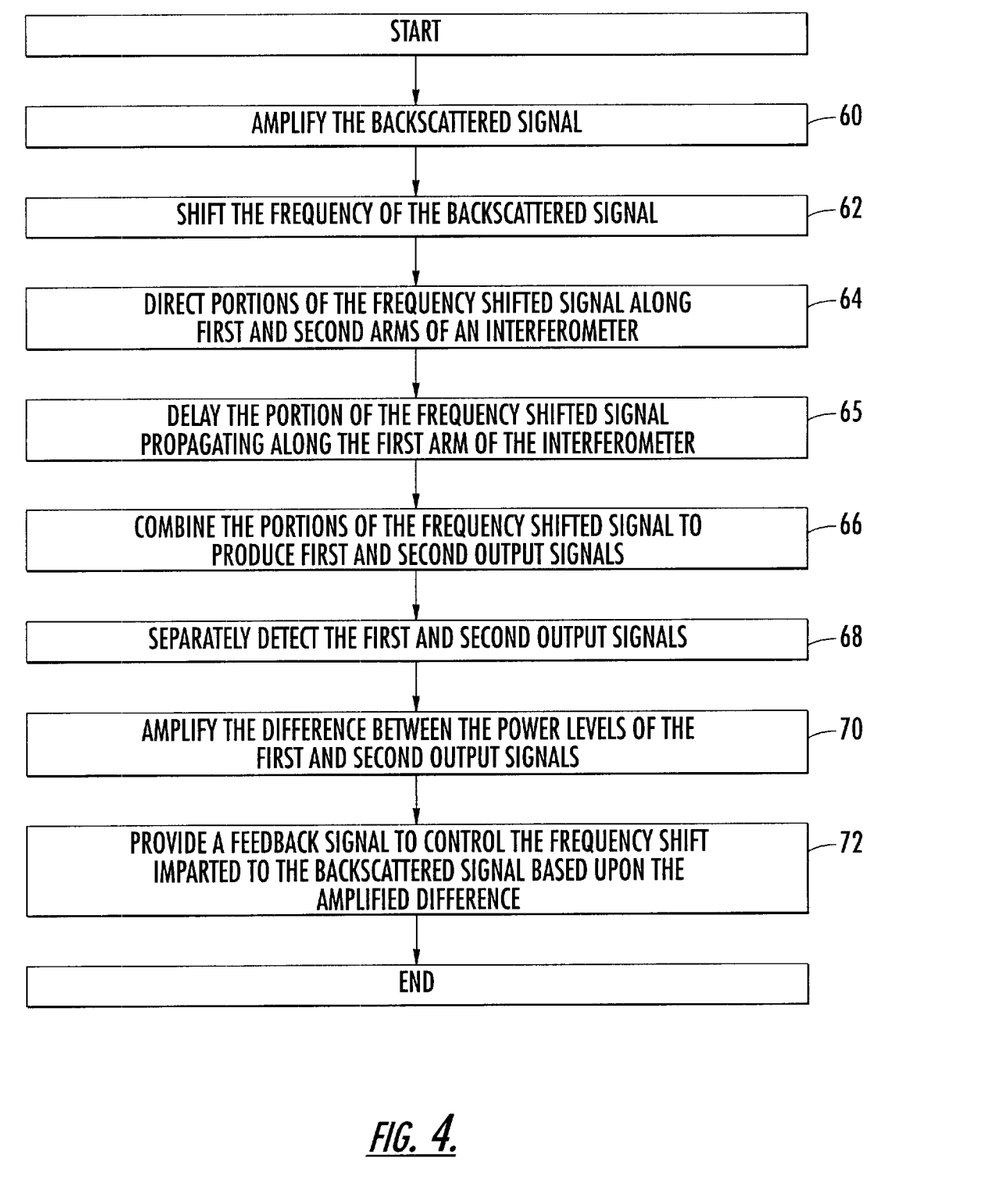
FIG. 4 is a flow chart illustrating the operations performed by a self-referencing microdoppler ladar receiver and an associated detection method according to one embodiment of the present invention.

The self-referencing microdoppler ladar receiver 16 also preferably includes a preamplifier 26 for amplifying the backscattered signals to a higher signal level and to enhance the signal-to-noise ratio of the self-referencing receiver. See FIG. 2 as well as block 60 of FIG. 4 which depicts the various operations performed by the self-referencing receiver of one advantageous embodiment. However, the self-referencing receiver need not include a preamplifier if the backscattered signals already have sufficient power. While the self-referencing receiver can include various types of preamplifiers, the self-referencing receiver of one embodiment includes a small-signal fiber amplifier, such as the fiber amplifiers utilized in fiber optic telecommunications applications. As will be appreciated by those skilled in the art, a small-signal fiber amplifier such as those utilized in fiber optic telecommunications applications amplify signals by as much as 50 dB and have a noise figure as low as 4 dB, thereby supporting the sensitivity of the self-referencing receiver of the present invention.

The self-referencing microdoppler ladar receiver 16 also includes a frequency shifter 28 for receiving the amplified backscattered signals from the preamplifier 26 and for controllably shifting the frequency of the backscattered signals. See block 62 of FIG. 4. In one advantageous embodiment, the frequency shifter is an acoustooptic frequency shifter that shifts the frequency spectrum of the amplified backscattered signals in response to a control signal that is typically a radio frequency (RF) control signal, as described below.

Figure 3:
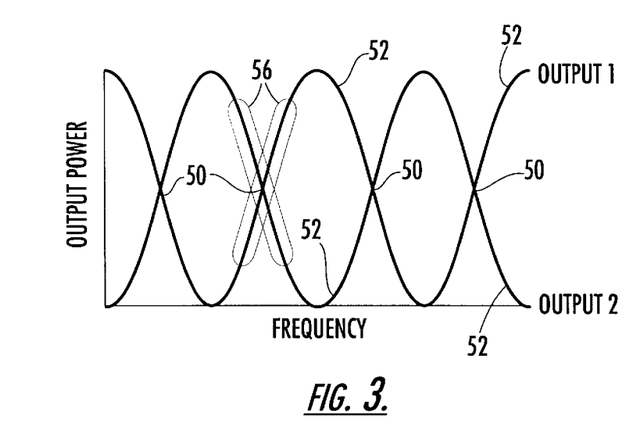
FIG. 3 is a graphical representation of the division of the output power between the first and second output signals provided by an interferometer having first and second paths of unequal length.

A self-referencing microdoppler ladar receiver 16 also includes an interferometer 30 having unequal path lengths. As depicted in FIG. 2, the interferometer is typically a Mach Zender fiber optic interferometer. However, the interferometer can be a Michelson interferometer or the like, if so desired. In the illustrated embodiment, however, the interferometer includes an input coupler 32, such as a 3 dB fiber optic coupler, for splitting the frequency shifted signal into first and second portions that are directed along first and second paths or arms 34, 36 of the interferometer. See block 64 of FIG. 4. According to the present invention, the first and second paths of the interferometer have different lengths. As such, the first path of the interferometer can include a delay loop 38 for delaying the respective portion of the frequency shifted signal by a predetermined time c relative to the other portion of frequency shifted signal propagating along the second path of the interferometer. See block 65. While the delay loop can include a loop of optical fiber of a predetermined length, the delay loop can include a switched fiber optic network such that delay loops of different selectable lengths can be inserted into the first path, thereby controllably altering the delay time τ so as to optimize the performance of the self-referencing microdoppler ladar receiver. In this regard, the frequency period, as depicted in FIG. 3, is inversely proportional to the delay time. Thus, the slope of the linear portion of the frequency curve depicted in FIG. 3 is also inversely proportional to the delay time. The slope of the linear portion of the frequency curve effectively establishes the frequency sensitivity of the receiver, that is, the measure of the difference signal that is generated per unit frequency deviation. Typically, high sensitivity is desirable unless the total spectral width exceeds the linear range around the set point, or unless the length of the fiber delay line becomes undesirably long.

As depicted in FIG. 2, the interferometer 30 of the illustrated embodiment also includes an output coupler 40, such as another 3 dB fiber optic coupler, for combining the portions of the frequency shifted signal propagating along the first and second paths 34, 36 of the interferometer. See block 66 of FIG. 4. Preferably, the interferometer is designed such that the splitting ratio defined by the input coupler 38 compensates for the additional loss that occurs during propagation through the delay loop in the first path such that the amplitude of the portions of the frequency shifted signal that have propagated along the first and second paths are equal upon reaching the output coupler.

The interferometer 30 of the illustrated embodiment provides first and second output signals. In particular, the output coupler 40 includes a pair of output arms 42 for providing the first and second output signals, respectively. The self-referencing microdoppler ladar receiver 16 also generally includes a balanced coherent receiver 44 for detecting and analyzing the first and second output signals provided by the output arms of the output coupler. As depicted in FIG. 2, for example, the balanced coherent receiver generally includes first and second detectors 46 for separately detecting the first and second output signals, respectively, provided by corresponding output arms of the output coupler. See block 68 of FIG. 4. While the first and second detectors can be designed in a number of different manners, the first and second detectors of one embodiment are photodiodes. The balanced coherent receiver can also include a differential amplifier 48 for combining the outputs of the first and second detectors in order to amplify the differences in the respective power levels of the first and second output signals. See block 70. While the balanced coherent receiver of the illustrated embodiment advantageously provides an amplified signal indicative of the differences in the respective power levels of the first and second output signals, the self-referencing receiver of the present invention can include other types of detectors for determining the differences in the respective power levels of a first and second output signals, if so desired.

As a result of phase changes between the optical signals provided to the output coupler 40 via the first and second arms 34, 36 of the interferometer 30, the output signal provided to one detector 46 will rise at the same time and in the same amount as the output signal provided to the other detector drops, and vice versa. Because of the unequal path lengths of the first and second paths of the interferometer, the power levels of the first and second output signals provided by the output coupler will therefore vary periodically with the instantaneous optical frequency of the output signals in a well known and highly deterministic way. In this regard, FIG. 3 depicts the output power levels of the first and second outputs of the output coupler for optical signals having different instantaneous frequencies. For those frequencies at which the power levels of the first and second output signals are equal, such as at those points 50 at which the sinusoidal curves intersect, the interferometer is in quadrature. However, for optical signals having other frequencies, the power levels of the first and second output signals will interchange sinusoidally with a period termed the "free spectral range" (FSR) defined as c/nL wherein c is the speed of light, n is the refractive index of the optical fiber, and L is the path length difference between the first and second paths of the interferometer. For example, at an instantaneous frequency such as designated 52 in FIG. 3, the output power will interchange sinusoidally between the first and second outputs of the output coupler.

According to the present invention, the interferometer 30 is preferably driven to quadrature by controlling the frequency shifter 28 to shift the frequency of the amplified backscattered signal, thereby altering the instantaneous frequency of the first and second output signals. As such, the self-referencing microdoppler ladar receiver 16 includes a signal processor 54 for providing a feedback signal to control the frequency shifter based upon differences in the respective power levels of the first and second output signals such that the interferometer is driven toward quadrature. See block 72 of FIG. 4. For example, the signal processor can be embodied as a voltage controlled oscillator responsive to the differential amplifier 48 of the balanced coherent receiver 44 which provides an RF signal indicative of the differences in the respective power levels of the first and second output signals. Based upon the signal provided by the differential amplifier, the signal processor, such as a voltage controlled oscillator, can provide a feedback or error signal to the frequency shifter in order to alter the frequency of the amplified backscattered signal in such a way that the instantaneous frequency of the first and second output signals is driven toward the point at which the interferometer is operating in quadrature.

Advantageously, the feedback or error signal generated by the signal processor 54 is linear with respect to frequency deviations of the first and second output signals from those frequencies at which the interferometer 30 is in quadrature. This linear relationship is best illustrated with reference to FIG. 3 in which those portions of the sinusoidal power curves proximate the points 50 at which the output power curves intersect are linear. See, for example, the substantially linear regions identified as 56 in FIG. 3.

The feedback signal provided by the signal processor 54 is proportional to the instantaneous frequency of the backscattered signal. As such, the signal processor not only provides a feedback signal to the frequency shifter 28, but the signal processor also preferably outputs the feedback or error signal as a measure of the instantaneous frequency of the backscattered signal. The instantaneous frequency of the backscattered signal is the result of several factors, namely, the mean frequency of the original signals provided by the master oscillator 18, deviations from the mean frequency of the signals provided by the master oscillator resulting from the spectral linewidth of the master oscillator, the Doppler shift induced by the closing velocity of the signals with the target 14 and the Doppler shift of the signals due to the vibrational velocity of the target. Of these factors, the mean frequency of the signals provided by the master oscillator is known and the master oscillator is preferably selected such that its linewidth is sufficiently narrow as described above so that the frequency shifts triggered by the vibrational velocity of the target are not masked by the frequency noise of the master oscillator. In addition, the Doppler shift produced by the closing velocity of the signals with the target will only be introduced in those instances in which there is some relative acceleration or deceleration between the transmitter 12 and the target, and is otherwise 0. In those instances in which the target is accelerating or decelerating, the feedback signal provided as an output by the signal processor can be further processed in order to distinguish the Doppler shift created by the closing velocity of the signals with the target and Doppler shift associated with the vibrational velocity of the target. In this regard, the signal processor can distinguish the different Doppler shifts since the Doppler shift created by the closing velocity of the signals with the target as a result of the acceleration or deceleration of the target will create a linear increase in the Doppler frequency with no oscillatory, while the vibrational velocity of a target will create an oscillatory Doppler shift. As will be apparent to those skilled in the art, the vibrational velocity of the target can then be determined based upon the frequency shifts created by the vibrations. In this regard, the backscattered signals are frequency modulated at the frequency with which the target is vibrating with a modulation index that depends upon the amplitude of the vibration. Based upon these backscattered signals, the frequency and amplitude of the vibrations can therefore be readily recovered in a like manner to conventional frequency demodulation techniques, such as those employed by FM radios and the like.

Advantageously, the amplitude of the feedback or error signal provided by the signal processor 54 does not depend upon the amplitude of the backscattered signals so long as the power level of the backscattered signals is sufficient to permit the frequency deviation of the backscattered signals to be measured. In addition, the microdoppler frequency deviation created by the vibrational velocity of a target depends upon the product of the amplitude of the vibration and the frequency of the vibration so that target vibrations having a large amplitude and/or a high frequency will facilitate detection by the self-referencing microdoppler ladar receiver 16 of the present invention. Additionally, the sensitivity of the self-referencing microdoppler ladar receiver to the vibrational velocity of a target is directly proportional to the difference in the path lengths of the first and second paths 34, 36 of the interferometer 30, so long as the coherence length of the signals provided by the master oscillator 18 is greater than the delay time introduced by the unequal path lengths. As such, the difference in path lengths of the first and second paths of the interferometer can be increased to correspondingly increase the sensitivity of the detector up to the limit imposed by the coherence length of the master oscillator.

As described, the self-referencing microdoppler ladar receiver 16 can determine the instantaneous frequency of the backscattered signal, which includes the vibrational velocity of the target 14, without a comparison to or phase lacking with the signals provided by the master oscillator 18. As such, the self-referencing microdoppler ladar receiver is capable of detecting the vibration of a target without a local reference derived from the transmitter 12 or, more particularly, from the master oscillator. Accordingly, the self-referencing receiver of the present invention can be located remote from the transmitter. In addition, the self-referencing receiver need not even be part of the same radar system as the transmitter, since the self-referencing receiver of one military force can detect the backscattered signals generated by the illumination of a target by the transmitter operated by another military force in order to monitor the intelligence being gathered by the other military force. Moreover, a plurality of self-referencing receivers can be positioned at different locations for detecting the signals backscattered from different portions of a target in order to collectively determine a more complete image of the vibrational velocity of the target, as depicted schematically in FIG. 1.

While the microdoppler ladar system 10 has been described in conjunction with a transmitter 12 and, more particularly, a master oscillator 18 that produces continuous wave signals illuminating the target 14, the master oscillator, can be modulated to produce a plurality of short pulses. In this regard, the output spectrum of a pulsed master oscillator would include a plurality of narrow lines of width $\Delta v$ separated by a frequency spacing of $F_p$. In instances in which the interpulse time, i.e. $1/F_p$, is equal to the delay time introduced into one path of an unequal path interferometer 30 of a self-referencing receiver 16, each frequency component of the pulse spectrum will fall at a corresponding quadrature point separated by one free spectral range. Since the feedback signals from the signal processor 54 to the frequency shifter 28 are designed to shift each frequency component of the pulse spectrum toward the corresponding quadrature point, the feedback or error signals provided by the signal processor are again proportional to the instantaneous frequency of the backscattered signal which, in turn, includes the vibrational velocity of the target, thereby permitting the vibration of the target to be detected without a local reference derived from the transmitter. While a microdoppler ladar system having a transmitter designed to produce a series of short pulses can be utilized in a variety of applications, the microdoppler ladar system of this embodiment is particularly useful in noisy environments since the pulses produced by the transmitter are generally more powerful than a comparable continuous wave signal.

Since the self-referencing microdoppler ladar receiver 16 of the present invention can detect vibrations of a target 14 without a local reference derived from the transmitter 12, the microdoppler ladar system 10 of the present invention is not limited by the requirement of a conventional microdoppler ladar systems that the coherence length of the signals provided by the master oscillator 18 be greater than the cumulative distance from the transmitter to the target and then to the receiver. Accordingly, the transmitter and the self-referencing receiver of the microdoppler ladar system of the present invention can be spaced at much greater distances from the target than conventional microdoppler ladar systems. As such, the microdoppler ladar system of the present invention is particularly advantageous for long-range applications, such as air-to-air, space-to-ground and ground-to-space applications. In addition, the sensitivity of the microdoppler ladar system of the present invention facilitates the utilization of the microdoppler ladar system in applications requiring the measurement of relatively small vibrational velocities, such as monitoring the vibrational velocity of a human from which the vital signs of the human can be determined, such as during lie detector tests and the like. The self-referencing receiver can therefore be incorporated in a wide variety of microdoppler sensors, laser doppler vibrometers or the like.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A self-referencing microdoppler ladar receiver comprising:

a frequency shifter for receiving a backscattered signal from a target that has been illuminated by a transmitter and for controllably shifting the frequency of the backscattered signal;

an interferometer for directing portions of the frequency shifted signal along first and second paths of unequal length and for combining the portions of the frequency shifted signal to produce first and second output signals; and a signal processor for providing a feedback signal to control said frequency shifter based upon differences in the respective power levels of the first and second output signals such that said interferometer is driven towards quadrature, wherein the feedback signal provided by said signal processor is proportional to an instantaneous frequency of the backscattered signal including frequency contributions due to a vibrational velocity of the target such that the vibration of the target is detectable without a local reference derived from the transmitter.

2. A self-referencing microdoppler ladar receiver according to claim 1 wherein the first path of said interferometer comprises a delay loop for delaying a respective portion of the frequency shifted signal by a predetermined time relative to the other portion of the frequency shifted signal.

3. A self-referencing microdoppler ladar receiver according to claim 1 wherein said interferometer comprises a coupler for combining the portions of the frequency shifted signal following propagation along the first and second paths to produce first and second output signals.

4. A self-referencing microdoppler ladar receiver according to claim 1 wherein said interferometer comprises a Mach Zender interferometer.

5. A self-referencing microdoppler ladar receiver according to claim 1 further comprising a balanced coherent receiver disposed between said interferometer and said signal processor, said balanced coherent receiver comprising:

first and second detectors for detecting the first and second output signals, respectively; and a differential amplifier for combining outputs of said first and second detectors to thereby amplify the differences in the respective power levels of the first and second output signals.

6. A self-referencing microdoppler ladar receiver according to claim 1 wherein said frequency shifter comprises an acoustooptic frequency shifter for shifting the frequency spectrum of the backscattered signals.

7. A self-referencing microdoppler ladar receiver according to claim 1 further comprising a preamplifier for amplifying the backscattered signal prior to providing the amplified backscattered signal to said frequency shifter.

8. A self-referencing microdoppler ladar receiver according to claim 1 wherein said signal processor comprises a voltage controlled oscillator.

9. A microdoppler ladar system comprising:

a transmitter for producing signals to illuminate a target; and a self-referencing receiver for receiving a backscattered signal from the target, said self-referencing receiver comprising:

a frequency shifter for controllably shifting the frequency of the backscattered signal;

an unequal path length interferometer for receiving the frequency shifted signal and for producing first and second output signals; and a signal processor for providing a feedback signal to control said frequency shifter based upon differences in the respective power levels of the first and second output signals such that said interferometer is driven towards quadrature, wherein the feedback signal is proportional to an instantaneous frequency of the backscattered signal including frequency contributors due to a vibrational velocity of the target such that the vibration of the target is detectable without a local reference derived from said transmitter.

10. A microdoppler ladar system according to claim 9 for detecting the target at a distance from said transmitter, wherein said transmitter is selected such that the signals produced thereby have a coherence length less than the cumulative distance from said transmitter to the target and from the target to said self-referencing receiver.

11. A microdoppler ladar system according to claim 9 wherein said transmitter comprises a master oscillator.

12. A microdoppler ladar system according to claim 9 wherein said interferometer comprises first and second paths having unequal path lengths for receiving portions of the frequency shifted signal, wherein the first path of said interferometer comprises a delay loop for delaying a respective portion of the frequency shifted signal by a predetermined time relative to the other portion of the frequency shifted signal.

13. A microdoppler ladar system according to claim 9 wherein said interferometer comprises a Mach Zender interferometer.

14. A microdoppler ladar system according to claim 9 wherein said self-referencing receiver further comprises a balanced coherent receiver disposed between said interferometer and said signal processor, said balanced coherent receiver comprising:

first and second detectors for detecting the first and second output signals, respectively; and a differential amplifier for combining outputs of said first and second detectors to thereby amplify the differences in the respective power levels of the first and second output signals.

15. A microdoppler ladar system according to claim 9 wherein said frequency shifter comprises an acoustooptic frequency shifter for shifting the frequency spectrum of the backscattered signals.

16. A microdoppler ladar system according to claim 9 wherein said self-referencing receiver is positioned remote from said transmitter.

17. A microdoppler ladar system according to claim 16 further comprising a plurality of self-referencing receivers disposed at respective positions such that each self-referencing receiver is remote from said transmitter and from the other self-referencing receivers.

18. A method of detecting vibration of a target without a local reference derived from a transmitter that illuminates the target, the method comprising:

controllably shifting the frequency of a signal backscattered from the target;

directing portions of the frequency shifted signal along first and second paths defined by an interferometer, wherein the first and second paths are of unequal length;

combining the portions of the frequency shifted signal to produce first and second output signals; and providing a feedback signal to control the frequency shift imparted upon the backscattered signal, wherein the feedback signal is based upon differences in the respective power levels of the first and second output signals such that the interferometer is driven towards quadrature, wherein the feedback signal is proportional to an instantaneous frequency of the backscattered signal including frequency contributions due to a vibrational velocity of the target such that the vibration of the target is detectable without a local reference derived from the transmitter.

19. A method according to claim 18 wherein directing portions of the frequency shifted signal along the first and second paths comprises delaying the portion of the frequency shifted signal propagating along the first path by a predetermined time relative to the other portion of the frequency shifted signal propagating along the second path.

20. A method according to claim 18 further comprising separately detecting the first and second output signals prior to providing the feedback signal.

21. A method according to claim 20 further comprising amplifying differences between the first and second output signals prior to providing the feedback signal.

22. A method according to claim 18 further comprising amplifying the backscattered signal prior to controllably shifting the frequency of the amplified backscattered signal.

* * * * *